May 14, 1957 A. BOTTINI 2,792,449

DEVICE FOR STEREOPHONICALLY RECORDING AND TRANSMITTING SOUND WAVES

Filed July 29, 1953 4 Sheets-Sheet 1

INVENTOR.
ALLERICO BOTTINI
BY
Zoltan Holochek
ATTORNEY

May 14, 1957 A. BOTTINI 2,792,449

DEVICE FOR STEREOPHONICALLY RECORDING AND TRANSMITTING SOUND WAVES

Filed July 29, 1953 4 Sheets-Sheet 2

INVENTOR.
ALLERICO BOTTINI
BY
Zoltan H. Polachek
ATTORNEY

DEVICE FOR STEREOPHONICALLY RECORDING AND TRANSMITTING SOUND WAVES

Filed July 29, 1953 4 Sheets-Sheet 3

INVENTOR.
ALLERICO BOTTINI
BY
Zoltan Polachek
ATTORNEY

INVENTOR.
ALLERICO BOTTINI
BY
Zoltan H. Polachek
ATTORNEY

United States Patent Office 2,792,449

Patented May 14, 1957

2,792,449

DEVICE FOR STEREOPHONICALLY RECORDING AND TRANSMITTING SOUND WAVES

Allerico Bottini, New York, N. Y.

Application July 29, 1953, Serial No. 371,113

4 Claims. (Cl. 179—1)

The present invention relates to electrical sound recording and reproducing systems and, more particularly, to a device for stereophonically recording or transmitting sound waves and to an accompanying device for the stereophonic reproduction of the recorded or transmitted sound waves.

For stereophonic recording of sound, use is generally made of two or more microphones which pick up the sound from its source and which are disposed at mutually spaced positions, the electrical signals generated by the mircophones being transmitted in separate amplifying channels. In known systems of this type, to record the stereophonic signals a separate recording device, such as a magnetic type recording machine, must be coupled to the output of each amplifying channel and a distinct record is made for each microphone signal. When the individual records are concurrently played back by reproducers, the reproduced signals from the several sound tracks are fed to separate speakers whose spacing corresponds approximately to that of the microphones. Thus a spatial distribution is imparted to the reproduced sound, giving a realistic, three-dimensional impression of the original sounds.

It is evident that a conventional stereophonic system as above-described, which requires two or more recording and reproducing machines, is difficult to operate, excessively elaborate in terms of equipment, and costly to construct. Moreover, when the records are simultaneously reproduced, synchronization problems arise, for the slightest time displacement between the records is immediately detected by the listener and impairs the fidelity of the sound and the three-dimensional effect of the recording.

Accordingly, it is the principal object of my invention to provide a new and improved stereophonic recording and reproducing system which entails but a single track recording and reproducing machine and yet produces realistic three-dimensional sound effects.

More particularly, it is an object of my invention to provide a stereophonic recording system wherein sound emanating from a source is picked up by spaced microphones and fed through separate channels to a single track recording machine, the channels being cyclically and sequentially actuated whereby the outputs of the channels are recorded in time multiplex relation on said track.

Still another object of my invention is to provide a stereophonic reproducing system for use in conjunction with a stereophonic recording system of the above type, wherein the time multiplex recording is played back and the resultant electrical signals are cyclically and successively fed through three separate amplifying channels to spaced reproducers.

It is also another object of the invention to provide a unitary stereophonic system entailing three separate amplifying channels and switching means adapted selectively to convert the system from recording to reproducing operation.

Still another object of my invention is to provide a stereophonic system of the above type wherein the amplifying channels are constituted by single-ended amplifiers during recording and are converted to push-pull amplifiers during reproductions.

It is a further object of my invention to provide a stereophonic recording and reproducing system which is of highly efficient electrical and acoustical design, but is of relatively simple and economical construction, whereby the system may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
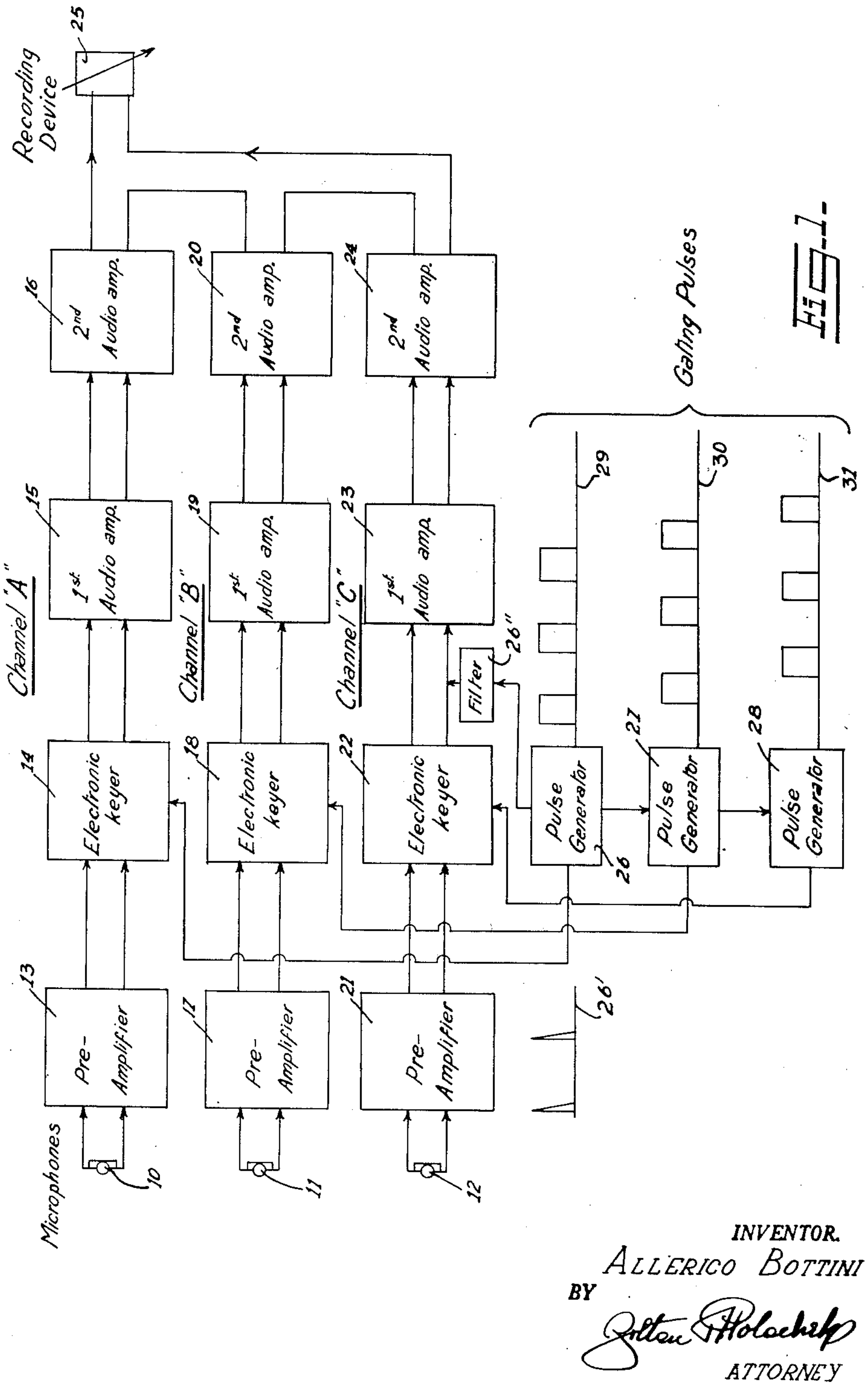
Fig. 1 is a block diagram of a stereophonic system in accordance with the invention, operating as a recording device.

Referring now to the drawings and more particularly to Fig. 1, there are shown three audio amplifying channels A, B and C, which include pickup microphones 10, 11 and 12, respectively. The microphones are suitably spaced in front of a pickup stage or other sound source, as is well understood in the art.

The audio currents generated by microphone 10 in channel A are transmitted through a pre-amplifier 13 and a normally blocked electronic keyer 14 to a first audio amplifier stage 15 whose output is fed to a second and final audio amplifier stage 16. Similarly, the output of microphone 11 is fed via a pre-amplifier 17 and a normally blocked electronic keyer 18 to the input of a first audio amplifier 19 whose output is connected to a second audio amplifier 20. In like fashion, the output of microphone 12 is transmitted via pre-amplifier 21 and a normally blocked electronic keyer 22 to the input of the first audio amplifier 23 whose output is applied to a second audio amplifier 24.

The outputs of the second audio amplifiers 16, 20 and 24 are applied in series relation to a single track recording element 25 which may be of any conventional type. Thus where tape or wire recording is to be employed, the element 25 may be a magnetic recording head, and where a disc recording is to be used, the element may be in usual crystal cutting head, or a magnet head.

The three channels A, B and C are cyclically and sequentially rendered operative, and for this purpose there is provided three pulse generators 26, 27 and 28, of any suitable design producing periodic square or rectangular gating pulses. Generator 26 produces a train of equispaced rectangular pulses, such as shown by wave form 29, the output of generator 26 being injected as a synchronization pulse into generator 27, whereby, as shown in wave form 30, the leading edge of the pulses produced by generator 27 is coincident in time with the trailing edge of the pulses produced by generator 26. Similarly, the output of generator 27 is applied as a synchronization pulse to generator 28, whereby the leading edge of the pulses produced by generator 28, as shown in wave form 31, is coincident in time to the trailing edge of the pulses produced by generator 27.

The pulses produced by generators 26, 27 and 28 are applied to electronic keyers or switches 14, 18 and 22, respectively, to actuate these keyers solely for the duration of the applied pulse, the keyers being otherwise blocked and inoperative. The keyers in each channel function when actuated to pass the signal from the associated pre-amplifier to the first audio stage. Consequently, in the course of one operating cycle; channel A is first rendered operative, while channels B and C remain blocked; then channel B is rendered operative while channels A and C remain blocked; and finally channel C is rendered operative while channels A and B remain blocked. Thereafter this cycle of operation is repeated. It will be evident, therefore, that the channels function cyclically and successively to provide a time division or multiplex operation in which each channel is active for one-third of the cycle.

Inasmuch as all three channels are coupled to a common single track recording device, the signal applied to said device is consituted cyclically by successive current samples derived from microphones 10, 11 and 12, respectively. The periodicity or keying rate at which the channels are periodically actuated should preferably be three times the highest frequency in the audio spectrum transmitted through the channels and is, for example, 30,000 cycles per second. Thus the single track stereophonic record produced by the recording device is made up of successive samples from the three sound pickup elements. Where the record is on tape or wire, the stereophonic impression is on a single tape or wire, where a disc record is cut, the stereophonic impression is on a single spiral track, and where film recording is employed a single sound track on the film is produced.

As shown by wave form 26′, synchronization impulses are impressed on the record, these impulses being extracted from pulse generator 26 by means of a suitable filter 26″, such as a differentiating network, said synchronization pulses being applied to the input of the first audio amplifier 23.

Figure 2:
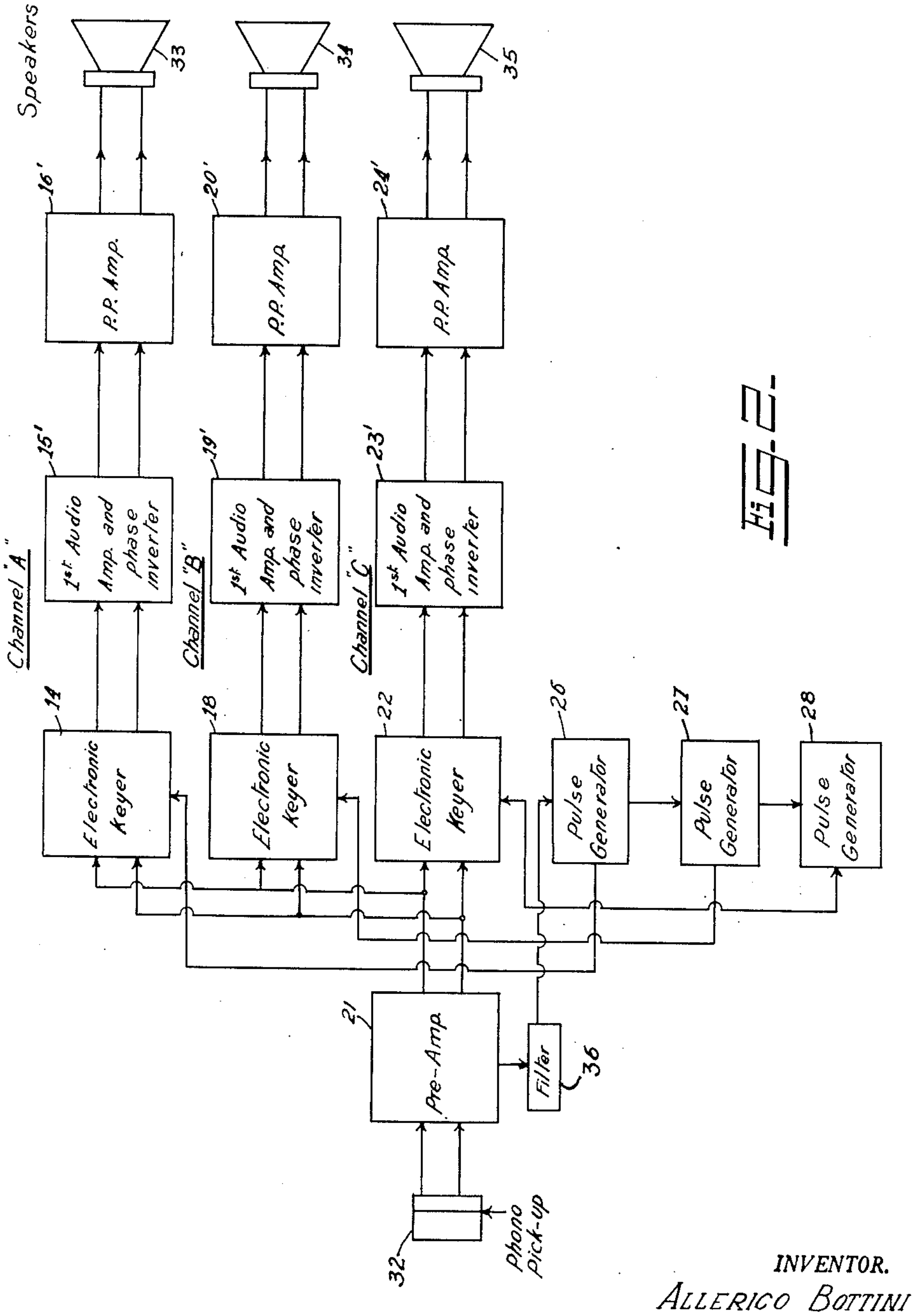
Fig. 2 is a block diagram of a stereophonic system in accordance with the invention, operating as a reproducing device.
Figure 3:
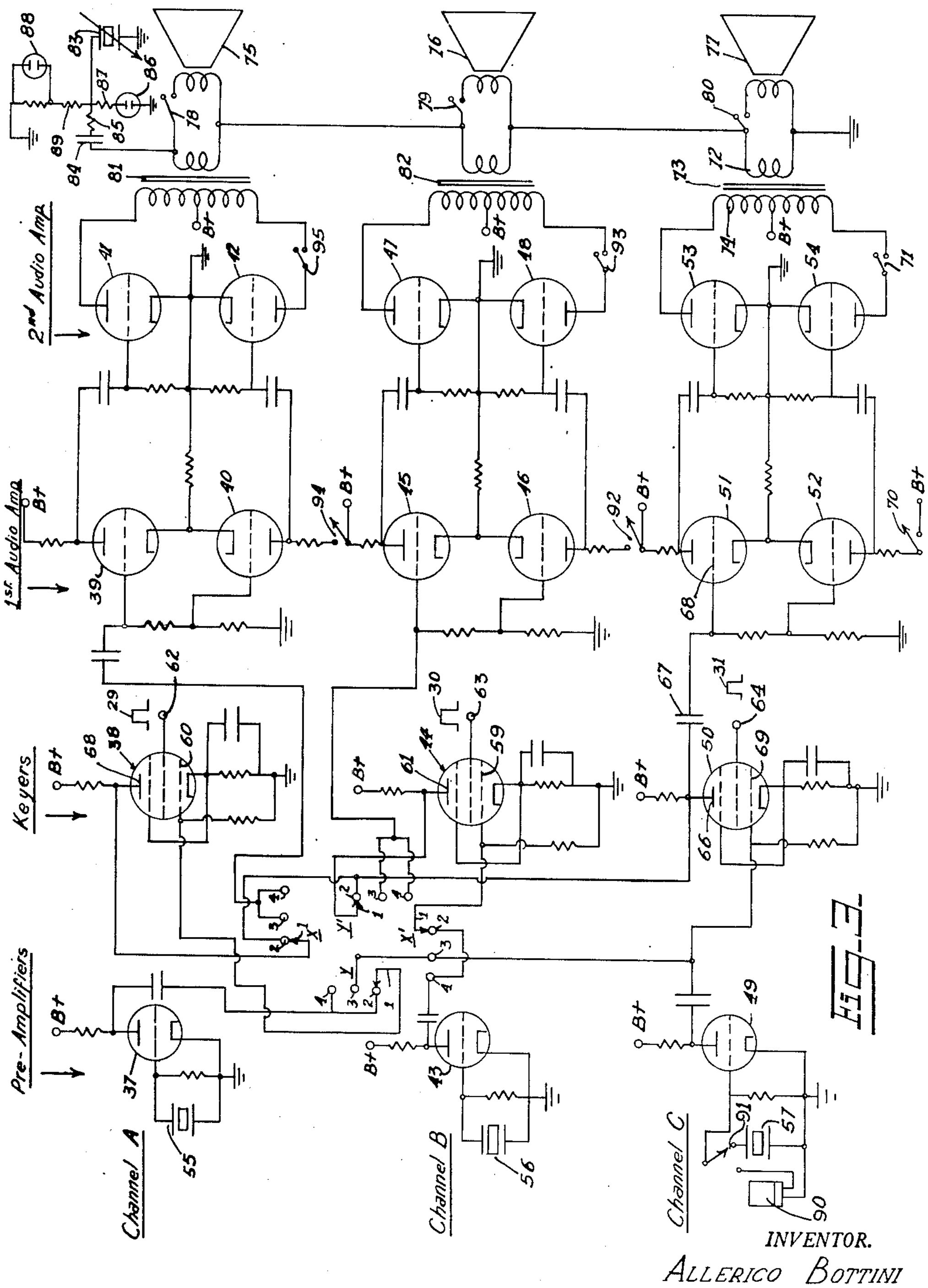
Fig. 3 is a schematic circuit diagram of a portion of a stereophonic recording and reproducing system.

In order to play back a single track stereophonic record of the type produced by the system illustrated in Fig. 1, the system is converted by switching means to be disclosed in connection with Fig. 3, to an arrangement as illustrated in Fig. 2, wherein like numerals represent like components. The channels A, B and C in Fig. 2 are identical with those shown in Fig. 1, except that the first audio amplifier 15 in Fig. 1 is of a single-ended type, whereas in Fig. 2 the first audio amplifier represented by numeral 15′ further includes a phase inverter, while the second audio amplifier 16′ in Fig. 2 is a push-pull amplifier, whereas the second audio amplifier in Fig. 1 is of a single-ended type. Similar differences exist between the first and second audio amplifiers 19′ and 20′ in channel B of Fig. 2 and those in Fig. 1, and between the first and second audio amplifiers 23′ and 24′ in channel C of Fig. 2 and those in Fig. 1.

A pickup device 32 of any suitable type is used to play back the record, the device in the case of a tape or wire recording being constituted by a magnetic pickup head, and in the case of a phonograph disc record by a crystal or permeability pickup arm of conventional design. The output of the pickup head is fed via pre-amplifier 21 and the respective keyer stages to the first audio amplifiers of all three channels. The outputs of channels A, B and C are applied to reproducing speakers 33, 34 and 35, respectively, the speakers being of any conventional design such as a permanent magnet or an electrodynamic speaker. In the reproducing arrangement shown in Fig. 2, the electronic keyers or switches 14, 18 and 22, act as distributors or commutators serving to feed only that portion of the recording corresponding to the related channel microphone to the speaker. Pre-amplifiers 13 and 17 are not used during reproductions since only a single track recording is involved.

To synchronize the operation pulse generator, the synchronization pulses on the recording are extracted therefrom by a filter 36 tuned to the frequency of the synchronization pulses (30,000 per second), these pulses being applied to pulse generator 26 to set off the sequence of gating pulses produced by generators 26 to 28, thereby to cyclically and successively actuate channels A, B and C, whereby speaker 33 reproduces solely the signals recorded in channel A, and speakers 34 and 35 reproduce solely the signals recorded in channels B and C, respectively. Although in this multiplex arrangement each channel signal is interrupted periodically by the keyer, this interruption is not audible to the listener in that it occurs at a rate beyond the aural range. Moreover, the use of push-pull amplifiers during reproduction tends to recreate the original sound, despite the keying interruptions therein.

Referring now to Fig. 3, there is shown the circuit of a three channel recording and reproducing stereophonic system including switching means to convert the system from recording to reproducing operation.

Channel A comprises a pre-amplifying stage provided with a triode tube 37, an electronic keyer stage provided with a pentode tube 38, a first audio amplifier including triodes 39 and 40, and a second audio amplifier including triodes 41 and 42. In channel B, the pre-amplifier includes triode 43; the keyer, pentode 44; the first audio amplifier, triodes 45 and 46; and the second audio amplifier, triodes 47 and 48. In channel C, the pre-amplifier includes triode 49; the keyer, pentode 50; the first audio amplifier, triodes 51 and 52; and the second audio amplifier triodes 53 and 54. Connected in the control grid circuits of preamplifiers 37, 43 and 49 are microphones 55, 56 and 57, respectively. Bias means for the various tubes are furnished by conventional cathode resistor arrangements and will, therefore, not be treated in detail.

For converting the system from recording to reproducing operation, there is provided four mechanically ganged switches X, X′, Y and Y′, each having a wiper contact 1 for selectively engaging three fixed contacts, 2, 3 and 4. Wiper 1 of switch X is connected to anode 58 of tube 38; wiper 1 of switch X′ is connected to control grid 59 of tube 44; wiper 1 of switch Y is connected to the control grid 60 of tube 38; and wiper 1 of switch Y′ is connected to anode 61 of tube 44. Applied to the screen grid terminals 62, 63 and 64 of keyer tubes 38, 44 and 50, respectively, are the gating pulses 29, 30 and 31, described in connection with Fig. 1. The circuit for producing these pulses will be discussed fully in connection with Fig. 4.

With the wipers of switches X, X′ and Y, Y′ engaging contact 2, in the position shown in Fig. 3, the system operates to record stereophonically and the behavior of the circuit will first be so considered.

The output of pre-amplifier 37 is fed via anode capacitor 65 through the contact 2 of switch Y to control grid 60 of the keyer stage 38. The anode output of keyer stage 38 is fed via contact 2 of switch X to the anode 66 of tube 50, from which point it is fed via condenser 67 to the grid 68 of the tube 51. The anode output of pre-amplifier 43 is fed via contact 2 of switch X′ to the grid 59 of keyer tube 44, and the anode 61 of keyer tube 44 is connected via contact 2 of switch Y′ to the grid 68 of first audio amplifier tube 51 via condenser 67. The anode output of pre-amplifier tube 49 is applied to control grid 69 of keyer tube 50 whose anode 66 is connected via condenser 67 to grid 68 of tube 51.

Thus in the contact 2 position of the switches, the outputs of the three keyers are all applied to control grid 68 of tube 51 for amplification solely in channel C, the remaining audio amplifiers in channels A and B not being used during recording. When recording, only single-ended audio amplifiers are used, hence switch 70 in the B+ lead of tube 52 in the first audio stage is opened to render this phase inverter tube inoperative. Switch 71 in the anode circuit of tube 54 in the second stage is also opened during recording. The signal amplified by tube 51 of the first amplifier stage is applied to control grid of tube 53, which acts as a second audio amplifier stage, the output of tube 53 being developed across the secondary 72 of a push-pull transformer 73, whose primary 74 is connected between the anodes of tubes 53 and 54. Inasmuch as tube 54 is inoperative during recording, the second audio stage is also single-ended.

During reproduction, the outputs of channels A, B and C are fed to dynamic speakers 75, 76 and 77, respectively, the moving coil of each speaker being connected via switches 78, 79 and 80, respectively, to the secondary of the related channel output transformer. The output transformer of channel A is designated by numeral 81, and that of channel B by numeral 82. The secondaries of transformers 81, 82 and 73 are serially connected between ground and a recording head 83, via condenser 84 and resistor 85. During recording, switches 78 and 80 are opened to disconnect the speakers 75 to 77, and when the switches X, X′ and Y, Y′ are on the contact 2 position, the output of amplifier 53 is fed serially through the secondaries of the transformers 81, 83 and 73 to recording head 83.

A neon bulb 86 is connected in series with a resistor 87 across the recording head 83 to indicate normal current conditions, while a neon bulb 88 connected across a portion of a resistor 89 shunted across the head serves to indicate overload current conditions.

The system is converted to stereophonic reproducing operation by positioning switches X, X′ and Y, Y′, on contacts 3. In this condition the outputs of pre-amplifiers 37 and 43 are disconnected, while only the output of pre-amplifier 49 in channel C is fed via the "3" contacts and the keyers 38, 44 and 50 to the first audio stage 39—40 of channel A, the first audio stage 45—46 of channel B, and the first audio stage 51—52 of channel C. A reproducing pickup head 90 in place of microphone 57 is coupled into the pre-amplifier 49 by means of selector switch 91. During reproduction, switches 70 and 71 in channel C are closed to put tubes 52 and 54 in circuit; switches 92 and 93 in channel B are closed to put tubes 46 and 48 in circuit; and switches 94 and 95 are closed to put tubes 40 and 42 in circuit.

Tubes 40, 46 and 52 act as phase inverters to provide a push-pull input to tubes 41—42, 47—48 and 53—54, respectively, which are now connected in push-pull relation in the second audio stage. Switches 78 to 80 are also closed to connect the speakers 75, 76 and 77 to the respective output transformers of the three channels. During reproduction, the rectangular gating pulses 29, 30 and 31 applied to keyers 38, 44 and 50 act sequentially to actuate the keyers and to distribute the multiplex signals picked up by the reproducing head from the single track record to the three channels, whereby the spaced speakers emit sounds corresponding to those picked up by the spaced microphones. This arrangement corresponds to that shown in block diagram in Fig. 2.

The number 4 position of switches X, X′, and Y, Y′ provides an alternative recording setup, wherein the outputs of the keyers 38, 44 and 50 are fed to the related audio amplifier stages in the respective channels, rather than to a common amplifier as with the contact 2 position. In this manner all the amplifiers are used and their outputs are combined serially to provide a greatly augmented output where high level recording is desired. This arrangement corresponds to that shown in block diagram in Fig. 1.

The number 4 position of switches X, X′, and Y, Y′ can also be used for the reproduction of music from a broadcast received and played in a stereophonic manner to give it a relastic reproduction.

Figure 4:
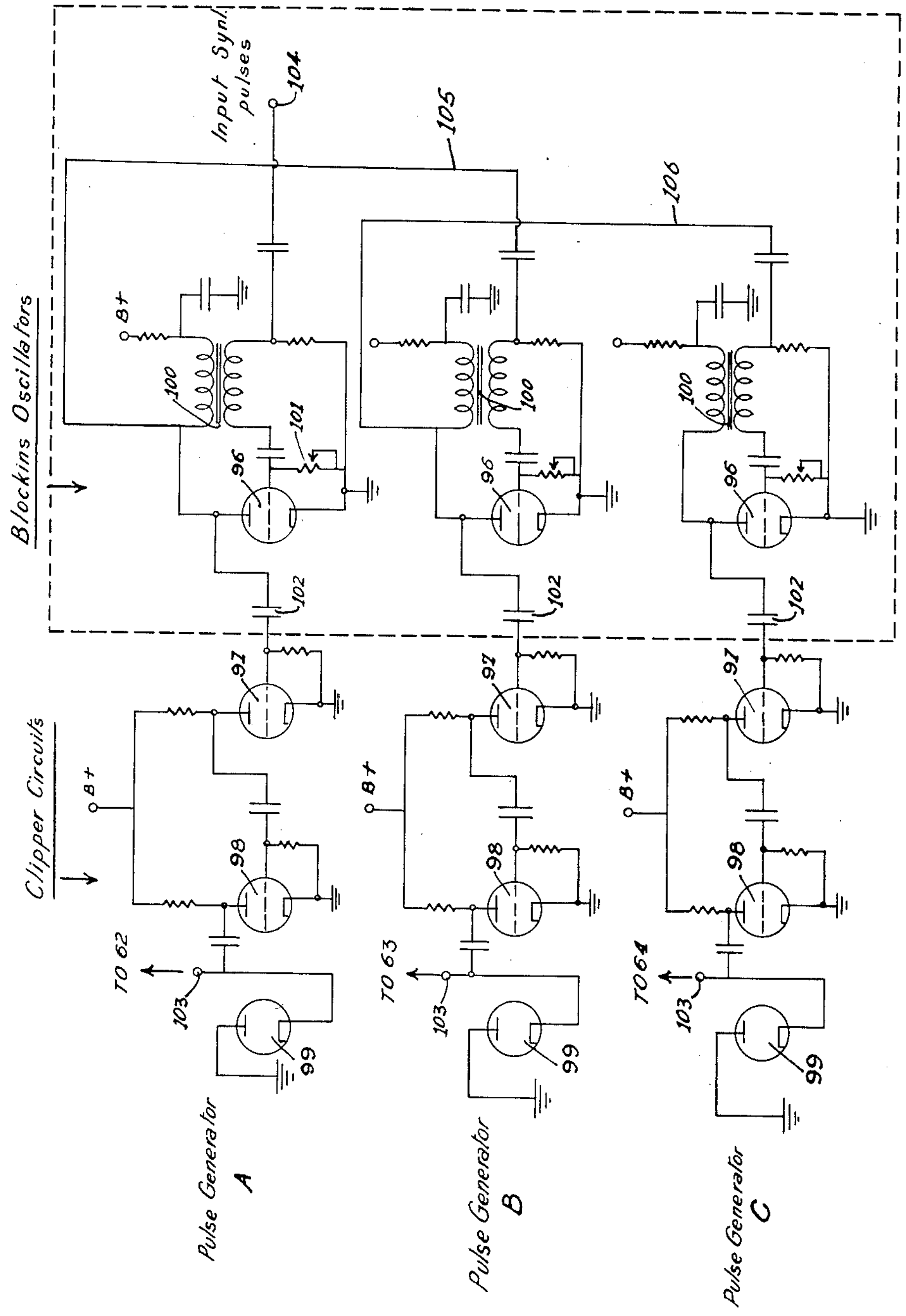
Fig. 4 is a schematic circuit diagram of the remaining portion of said stereophonic system.

Referring now to Fig. 4, the three pulse generators for providing rectangular gating pulses for the A, B and C channels are each constituted by a blocking oscillator including a triode 96 and a clipper circuit including triodes 97 and 98 and a diode 99. The blocking oscillator includes a feedback transformer 100 regeneratively coupling the anode circuit to the grid circuit. The oscillator frequency is controllable by means of a variable resistor 101 in the blocking grid circuit. The pulsatory output of the blocking oscillator is fed via condenser 102 to the input of tube 97 of the clipper stage which serves to clip or flatten the top of the pulses, the diode 99 acting to remove the negative-going portion thereof, whereby the pulses produced at the cathode terminal 102 of diode has a rectangular position-going form.

Synchronization pulses for blocking oscillator tube 96 are applied at terminal 104 to the grid circuit thereof. Pulse generator A acts to synchronize the operation of pulse generator B by means of a connection 105 between the anode of tube 96 and the grid circuit of generator B. In a like manner, a connection 105 is made between the anode of the blocking oscillator tube in generator B and the grid circuit of the blocking oscillator tube in generator C. Thus the leading edge of the pulses produced by generator C coincides with the trailing edge of the pulses of generator B, and the leading edge of the generator B pulses coincides with the trailing edge of the generator A pulses.

Thus an arrangement in accordance with the invention is of simplified design entailing but a single track record for three-dimensional stereophonic effects. The system can be employed successfully with film recording as well as tape, wire and disc recording and in lieu of three channels, as disclosed, a greater number may be used if preferred. The system is also operable with two channels for binaural recording.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. A combined stereophonic recording and reproducing device, comprising a plurality of channels, each of said channels having connected in succession: a microphone, a preamplifier stage, a keyer stage, an audio amplifier stage, and a loudspeaker; means for applying rectangular gating pulses in sequence to the keyer stages in each of said channels, a reproducing pickup head and a recording head connected to opposite ends of said channels, and adjustable switch means settable in one position to connect said pickup head to a certain preamplifier stage in one of said channels and to connect said preamplifier to the keyer stage in each of said channels while disconnecting said microphones and recording head, to reproduce via said loudspeaker signals picked up by said pickup head and delivered to said loudspeakers in a timed sequence under control of said gating pulses.

2. A combined stereophonic recording and reproducing device, comprising a plurality of channels, each of said channels having connected in succession: a microphone, a preamplifier stage, a keyer stage, an audio amplifier stage, and a loudspeaker; means for applying rectangular gating pulses in sequence to the keyer stages in each of said channels, a reproducing pickup head and a recording head connected to opposite ends of said channels, and adjustable switch means settable in one position to connect said pickup head to a certain preamplifier stage in one of said channels and to connect said preamplifier to the keyer stage in each of said channels while disconnecting said microphones and recording heads, to reproduce via said loudspeaker signals pick up by said pickup head and delivered to said loudspeakers in a timed sequence under control of said gating pulses, said switch means being settable in another position to connect the microphones respectively to each of the keyer stages, to connect the keying stages to one of the audio amplifier stages, and to connect the recording head to said one audio amplifier stage while disconnecting said pickup head and said loudspeakers, to record other signals picked up by said microphones in a timed sequence under control of said gating pulses.

3. A combined stereophonic recording and reproducing device, comprising a plurality of channels, each of said channels having connected in succession: a preamplifier stage, a keyer stage, a first audio amplifier, and a second audio amplifier; a plurality of ganged switches, each of said switches having a movable contact connected to the keyer stages of two of said channels, means for applying timed gating pulses to the keyer stage in each of said channels, said switches having certain fixed contacts so connected that each of said keyer stages have their outputs connected to the first audio amplifier in one of said channels for amplifying signals to be recorded, a plurality of microphones connected respectively to each of the preamplifier stages to provide said signals, a recording head, a plurality of transformers, said head being connected via a series arrangement of the secondaries of said transformers to the audio amplifier in said one channel in a single ended arrangement, said switches having other fixed contacts so connected that the output of the preamplifier stage in said one channel is connected respectively via the keyer stages in each of said channels to the first audio amplifiers in each of said channels for passing other signals to be reproduced, a reproducing pickup head for supplying said other signals, another switch arranged to selectively connect said pickup head and one of said microphones to the preamplifier stage in said one channel, and a plurality of loudspeakers respectively connected via said transformers and further switches to the second audio amplifier in each of said channels in double ended push pull arrangement, whereby signals are reproduced and recorded in timed sequence under control of the gating pulses applied to the keyer stages.

4. A combined stereophonic recording and reproducing device, comprising a plurality of channels, each of said channels having connected in succession: a preamplifier stage, a keyer stage, a first audio amplifier, and a second audio amplifier; a plurality of ganged switches, each of said switches having a movable contact connected to the keyer stages of two of said channels, means for applying timed gating pulses to the keyer stage in each of said channels, said switches having certain fixed contacts so connected that each of said keyer stages have their outputs connected to the first audio amplifier in one of said channels for amplifying signals to be recorded, a plurality of microphones connected respectively to each of the preamplifier stages to provide said signals, a recording head, a plurality of transformers, said head being connected via a series arrangement of the secondaries of said transformers to the audio amplifier in said one channel in a single ended arrangement, said switches having other fixed contacts so connected that the output of the preamplifier stage in said one channel is connected respectively via the keyer stages in each of said channels to the first audio amplifiers in each of said channels for passing other signals to be reproduced, a reproducing pickup head for supplying said other signals, another switch arranged to selectively connect said pickup head and one of said microphones to the preamplifier stage in said one channel, and a plurality of loudspeakers respectively connected via said transformers and further switches to the second audio amplifier in each of said channels in double ended push pull arrangement, said plurality of switches having further fixed contacts so connected that the outputs of each of the keyer stages in each of said channels are respectively connected to the first audio amplifier in the corresponding channel to provide an alternative arrangement for passing selectively signals to be recorded and signals to be reproduced, whereby signals are reproduced and recorded in timed sequence under control of the gating pulses applied to the keyer stages.

References Cited in the file of this patent

UNITED STATES PATENTS

| | | |
|---|---|---|
| 2,007,809 | Nicolson | July 9, 1935 |
| 2,048,081 | Riggs | July 21, 1936 |
| 2,072,527 | Nicolson | Mar. 2, 1937 |
| 2,538,869 | Holst | Jan. 23, 1951 |
| 2,561,338 | Camras | July 24, 1951 |

FOREIGN PATENTS

| | | |
|---|---|---|
| 584,427 | Great Britain | Jan. 15, 1947 |